UNITED STATES PATENT OFFICE.

HENRY AITKEN, OF DARROCH, FALKIRK, COUNTY OF STIRLING, SCOTLAND.

PRESERVING TIMBER.

SPECIFICATION forming part of Letters Patent No. 352,216, dated November 9, 1886.

Application filed November 10, 1884. Serial No. 147,527. (No specimens.) Patented in England January 2, 1882, No. 3.

*To all whom it may concern:*

Be it known that I, HENRY AITKEN, of Darroch, Falkirk, in the county of Stirling, Scotland, have invented a new and useful Improvement in Preserving Timber; and I do hereby declare the following to be a full, clear, and exact description thereof.

My invention relates to an improvement in preserving timber; and it consists in treating the timber with naphthaline, or chrysene, or pyrene in the manner hereinafter described. By the term "naphthaline" I mean the naphthaline series of hydrocarbons which corresponds or approaches to the formula $C_{10}H_8$, and by "chrysene" the series of hydrocarbons which corresponds to the formula $C_{18}H_{12}$, or that which is very approximately of the same constitution—namely, pyrene—known in oil and tar works as "slubbers" or "gundy," and having the formula $C_{10}H_{10}$. For commercial purposes chrysene and pyrene are not usually distinguished from each other, since they pass off together in distillation at substantially the same temperature.

The above-named substances, or any of them, are applied to the timber while they are in a heated state, so that they may sink into the pores of the timber more readily. The degree of heat applied should be enough to melt the hydrocarbon; but its intensity is regulated according to the object for which the wood is intended to be used. When it is desirable that the cohesive strength or tenacity of the wood should not be impaired, the naphthaline is applied while at a low temperature, and the duration of the treatment is continued for a longer time, so that the wood may be sufficiently saturated. If, however, it be not an object to preserve the cohesion of the fibers intact, the temperature of the substance may be increased and the process thereby hastened. It will also depend somewhat upon the nature of the wood treated, for I have found soft timber—such as fir or pine—may be subjected to a greater heat than oak or other hard woods without injuring the fibers.

The preferable manner of applying the naphthaline is to heat it in a suitable tank or vessel and then to immerse the timber therein, placing suitable weights upon it, or otherwise causing it to sink and to be covered by the molten substance. In order to cause heat to be evenly applied to the tank and to prevent the hydrocarbon from being burned, the vessel may be made of wood and heated by arranging steam-pipes or hot-air or gas pipes in the sides and bottom; or it may be made of metal and heated by an inclosing steam-jacket, or by pipes, as before described.

If desired, the heat may be applied directly by introducing steam or heated air or gases among the materials in the tank.

In some cases a furnace may be used, the heat of which either comes into direct contact with the vessel or passes through a body of sand placed between its bottom and the flame. About 190° or 200° Fahrenheit are suitable temperatures for the naphthaline when used in treating oak and hard wood, while the liquid may be heated five or ten degrees more in the tank when used for pine or fir. I do not, however, desire to limit my invention by the degrees of heat which I have indicated as preferable.

When it is desirable that the timber should be thoroughly saturated and covered on the outside with the naphthaline, it should not be taken from the tank until the temperature of this substance has been lowered to about its melting-point. When, however, the timber is not desired to be so completely treated, steam or water may be added to the naphthaline and the wood immersed in this mixture.

The surplus of naphthaline may be removed from the outside of the timber by removing it from the tank while the naphthaline is hot, or by subjecting it to hot water or steam after it has been treated.

Timber may be rendered dense and less capable of absorbing moisture in the following manner: Having been treated by immersion for a sufficient length of time, it is taken from the tank, compressed by hydraulic or other power, and, finally, redipped into the liquefied substance when it is at a temperature a little above its melting-point. This process will leave a coating of naphthaline on the surface of the timber, and by reason of the above-named qualities will make it especially useful as insulators for carrying conductors of electricity and for similar purposes.

Pressure may be used to force the hot naphthaline into the wood in the same manner as creosote-oils are usually applied, or the vessel in which it is treated may be closed, so as to exclude air from its contents.

The timber may be made less liable to burn by charring its surface or dipping it in sulphuric acid, or by passing hot water or steam over it after it has been treated.

When special care is to be taken to keep the fibers of the wood unimpaired, the timber should be put into the tank when the naphthaline is cold or only partially heated, and a gradual heat applied. The timber should also be allowed to cool gradually, either by leaving it in the tank and slacking the heat, or by removing it from the tank and covering it with sawdust or placing it in a closed chamber.

Instead of applying the naphthaline, or chrysene, or pyrene when heated, they may be dissolved in a suitable solvent and spread upon the timber with a brush. Benzole, shale-spirit, and petroleum-spirit may be used as such solvents. Crude benzole and benzole-spirit are the best solvents of chrysene.

I deem naphthaline, chrysene, and pyrene to be equivalents of each other for the purpose of preserving wood, and I desire to cover them as such in this application for Letters Patent.

The special advantages of my improved process are, that timber so treated is made denser and more impervious to the action of moisture and rot. Insects, and the lower forms of animal life in general, dislike naphthaline, chrysene, and pyrene, and will not attack wood treated therewith. These qualities make the timber well fitted for use in making railway-ties, electrical insulators, bearings for machinery, and nearly all kinds of building purposes. Each of these substances may be applied to timber in any of the modes hereinbefore described, and I do not wish to limit myself to the use of a specific form of apparatus.

As the hydrocarbons naphthaline, chrysene, and pyrene are so nearly related to each other in their chemical constituents as to be equivalents of each other, I do not desire by the use of the word "naphthaline" to limit myself to that substance to the exclusion of the other substances here mentioned.

I am aware that coal-tar oil and dead-oil (both of which contain a certain amount of naphthaline combined with other substances) have been employed for the purpose of preserving wood, and that coal-tar has been used for a like purpose. I do not, however, desire to claim the same.

What I claim as my invention, and desire to secure by Letters Patent, is—

1. As an improvement in the art of preserving timber, saturating the timber or the outer surface thereof with naphthaline.

2. Timber the outer surface of which has been saturated with naphthaline.

In testimony whereof I have hereunto set my hand the 22d day of October, A. D. 1884.

HENRY AITKEN.

Witnesses:
   WILLIAM BLACK ALLAN,
   JOHN RAE,
      *Both of Falkirk, Law Clerks.*